United States Patent
Kashiwagi et al.

(10) Patent No.: US 8,055,882 B2
(45) Date of Patent: Nov. 8, 2011

(54) MULTIPLEXING COMMANDS FROM PROCESSORS TO TIGHTLY COUPLED COPROCESSOR UPON STATE BASED ARBITRATION FOR COPROCESSOR RESOURCES

(75) Inventors: Shinji Kashiwagi, Kanagawa (JP); Hiroyuki Nakajima, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 12/175,882

(22) Filed: Jul. 18, 2008

(65) Prior Publication Data

US 2009/0024834 A1    Jan. 22, 2009

(30) Foreign Application Priority Data

Jul. 20, 2007   (JP) .................. 2007-189769

(51) Int. Cl.
  *G06F 15/16* (2006.01)
(52) U.S. Cl. .......................... 712/34; 710/240
(58) Field of Classification Search ............... None
See application file for complete search history.

(56) References Cited

U.S. PATENT DOCUMENTS

| | | | |
|---|---|---|---|
| 3,805,247 A | 4/1974 | Zucker et al. | |
| 5,182,801 A | 1/1993 | Asfour | |
| 5,303,391 A | 4/1994 | Simcoe et al. | |
| 5,371,893 A | 12/1994 | Price et al. | |
| 5,430,851 A | 7/1995 | Hirata et al. | |
| 5,574,939 A | 11/1996 | Keckler et al. | |
| 5,754,865 A | 5/1998 | Itskin et al. | |
| 5,784,394 A | 7/1998 | Alvarez, II et al. | |
| 5,949,982 A | 9/1999 | Frankeny et al. | |
| 6,026,478 A | 2/2000 | Dowling | |
| 6,041,400 A | 3/2000 | Ozcelik et al. | |
| 6,049,845 A | 4/2000 | Bauman et al. | |
| 6,055,619 A | 4/2000 | North et al. | |
| 6,173,349 B1 | 1/2001 | Qureshi et al. | |
| 6,185,221 B1 | 2/2001 | Aybay | |
| 6,230,229 B1 | 5/2001 | Van Krevelen et al. | |
| 6,260,174 B1 | 7/2001 | Van Loo | |
| 6,581,124 B1 | 6/2003 | Anand | |
| 6,594,752 B1 | 7/2003 | Baxter | |
| 6,628,662 B1 | 9/2003 | Blackmon et al. | |

(Continued)

FOREIGN PATENT DOCUMENTS

JP     2006260377     9/2006

OTHER PUBLICATIONS

Toshiba Semiconductor Product Catalog General Information on Mep (Media embedded Processor) Internet URL:<http://www.semicon.toshiba.co.jp/docs/calalog/ja/BCJ0043_catalog.pdf.

*Primary Examiner* — Kenneth Kim
(74) *Attorney, Agent, or Firm* — Sughrue Mion, PLLC

(57) ABSTRACT

Disclosed is a multiprocessor apparatus including a plurality of processors connected to a common bus, a co-processor provided in common to the processors, an arbitration circuit that arbitrates contention among the processors with respect to use of a resource in the co-processor through a tightly coupled bus by the processors and a multiplexer coupled to the arbitration circuit, coupled to the processors through a local buses, and coupled to the co-processor through the local buses to transfer the commands received from the respective processors to the co-processor in accordance with a permission signal output by the arbitration circuit.

12 Claims, 12 Drawing Sheets

U.S. PATENT DOCUMENTS

| | | |
|---|---|---|
| 6,687,797 B1 | 2/2004 | Walton |
| 6,829,697 B1 | 12/2004 | Davis et al. |
| 7,013,357 B2 | 3/2006 | Murdock et al. |
| 7,281,071 B2 | 10/2007 | Carey |
| 7,584,345 B2 * | 9/2009 | Doering et al. ............... 712/227 |
| 7,587,543 B2 | 9/2009 | Genova et al. |
| 2004/0257370 A1 * | 12/2004 | Lippincott et al. ............ 345/502 |
| 2008/0052493 A1 * | 2/2008 | Chang ............................ 712/41 |
| 2008/0147944 A1 * | 6/2008 | Sonntag et al. ............... 710/240 |
| 2008/0282007 A1 * | 11/2008 | Moran et al. .................. 710/110 |

* cited by examiner

FIG.6A

● CASE OF TIGHTLY COUPLED BUS

WHEN THERE IS ACCESS CONTENTION FOR CIRCUIT RESOURCE (a) CO-PROCESSOR INSTRUCTION
ISSUED BY PROCESSOR A

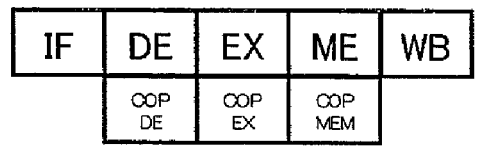

(b) WAIT SIGNAL FOR PROCESSOR B

(c) CO-PROCESSOR INSTRUCTION
ISSUED BY PROCESSOR B

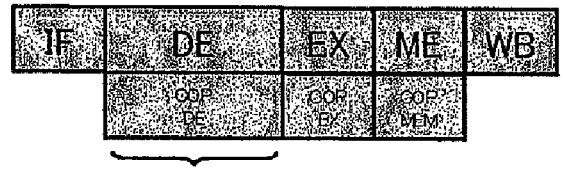

STALL

FIG.6B

WHEN THERE IS NO ACCESS CONTENTION FOR CIRCUIT RESOURCE (a) CO-PROCESSOR INSTRUCTION
ISSUED BY PROCESSOR A

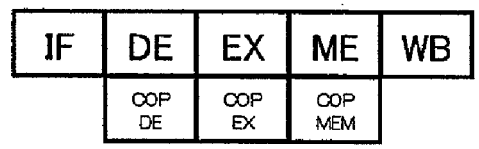

(b) WAIT SIGNAL FOR PROCESSOR B        Low

(c) CO-PROCESSOR INSTRUCTION
ISSUED BY PROCESSOR B

FIG.7A COMPARATIVE CASE
● CASE OF LOOSELY COUPOLED BUS (WITH 1:2 PROCESSOR-CLOCK TO BUS-CLOCK RATIO)

WHEN THERE IS ACCESS CONTENTION FOR SHARED CO-PROCESSOR

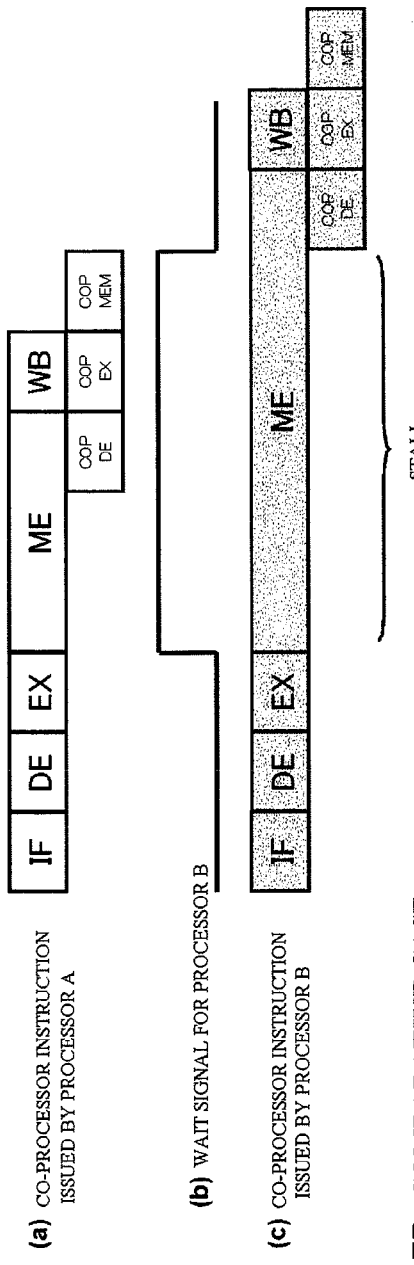

(a) CO-PROCESSOR INSTRUCTION ISSUED BY PROCESSOR A (b) WAIT SIGNAL FOR PROCESSOR B (c) CO-PROCESSOR INSTRUCTION ISSUED BY PROCESSOR B

FIG.7B COMPARATIVE CASE

WHEN THERE IS NO ACCESS CONTENTION FOR SHARED CO-PROCESSOR

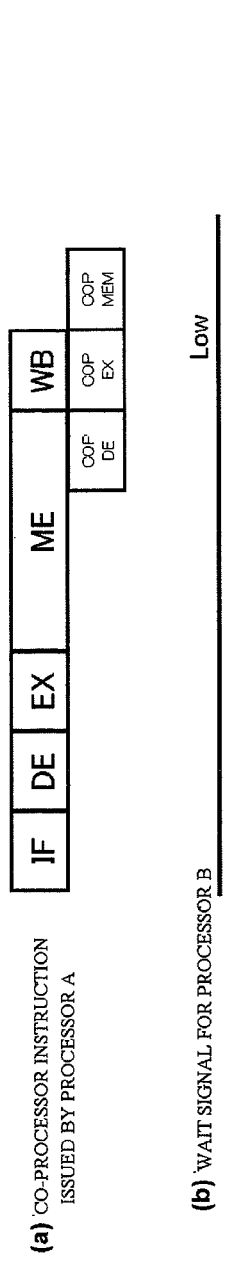

(a) CO-PROCESSOR INSTRUCTION ISSUED BY PROCESSOR A (b) WAIT SIGNAL FOR PROCESSOR B (c) CO-PROCESSOR INSTRUCTION ISSUED BY PROCESSOR B

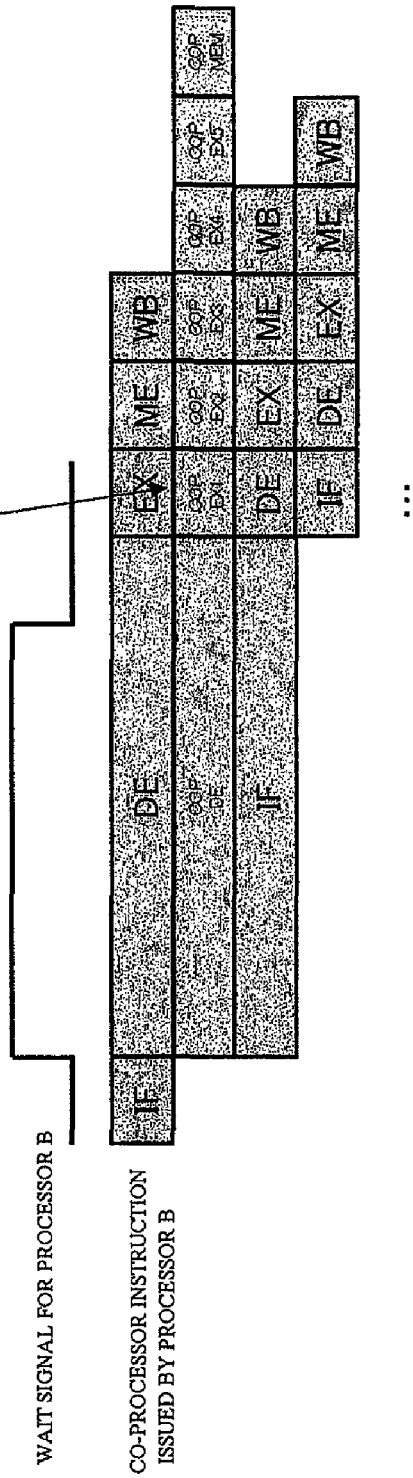

MULTIPLEXING COMMANDS FROM PROCESSORS TO TIGHTLY COUPLED COPROCESSOR UPON STATE BASED ARBITRATION FOR COPROCESSOR RESOURCES

This application is based upon and claims the benefit of the priority of Japanese patent application No. 2007-189769 filed on Jul. 20, 2007, the disclosure of which is incorporated herein in its entirety by reference thereto.

TECHNICAL FIELD

The present invention relates to an apparatus including a plurality of processors. More specifically, the invention relates to a system configuration suitable for being applied to an apparatus in which co-processor resources are shared by the processors.

BACKGROUND ART

A typical configuration example of a multiprocessor (parallel processor) system of this type will be shown in FIG. 9 (refer to Non-Patent Document 1). The multiprocessor (parallel processor) system includes a plurality of symmetrical or asymmetrical processors and co-processors. In this system, a memory and a peripheral IO are shared by the processors.

Co-processors (co-processors) are classified into the following two types:

co-processors that assists processors by taking charge of specific processing (audio, video, or wireless processing, or an arithmetic operation such as a floating-point arithmetic or an arithmetic operation of an FET (Fast Fourier Transform) or the like); and co-processors that serve as hardware accelerators that perform whole processing necessary for the specific processing (audio, video, wireless processing, or the like)

In the multiprocessor including plurality processors, a co-processor may be shared by the processors like the memory, or the co-processor may be exclusively used locally by a processor.

An example shown in FIG. 9 is a configuration in which a co-processor is exclusively used locally by a processor. Then, an example of an LSI configuration using a configurable processor MeP (Media embedded Processor) technique is shown.

FIG. 10 is a simplified diagram for explaining the configuration in FIG. 9. As shown in FIG. 10, a processor 201A and a processor 201B are tightly coupled to co-processors 203A and 203B for specific applications through local buses for the processors, respectively. Local memories 202A and 202B store instructions and operation data to be executed by the processors 201A and 201B, respectively.

A parallel processing device of a configuration in which a multiprocessor and peripheral hardware (composed of co-processors and various peripheral devices) connected to the multiprocessor are efficiently emphasized is disclosed in Patent Document 1. FIG. 11 is a diagram showing a configuration of a CPU disclosed in Patent Document 1. Referring to FIG. 11, the configuration includes a plurality of processor units P0 to P3 each of which executes a task or a thread. The configuration includes a CPU 10 connected to co-processors 130a and 130b and peripheral hardware composed of peripheral devices 40a to 40d. Each processor unit that executes a task or a thread asks the peripheral hardware to process the task or thread according to execution content of the task or thread being executed. FIG. 12 is a simplified diagram of the configuration in FIG. 11. As shown in FIG. 12, the processors P0 to P3, and co-processors 130a and 130b are connected to a common bus. Then, the processors P0 to P3 access the co-processors 130a and 130b through the common bus.

[Patent Document 1]
JP Patent Kokai Publication No. JP-P-2006-260377A

[Non-Patent Document 1]
Toshiba Semiconductor Product Catalog General Information on Mep (Media embedded Processor) Internet URL: <http://www.semicon.toshiba.co.jp/docs/calalog/ja/BCJ0043_catalog.pdf>

SUMMARY

The entire disclosures of above Patent and Non-Patent Documents are herein incorporated by reference thereto. The following analysis is given by the present invention.

The configuration of the related art described above has the following problems (according to an analysis result by the inventor of the present invention and so on).

When the coprocessors 203A and 203B are tightly coupled to the local buses for the processors 201A and 201B, respectively, as shown in FIG. 10, other processor on the common bus cannot access the co-processors.

Further, the processors 201A and 201B locally have circuits (such as a computing unit and a register) necessary for the co-processors 203A and 203B, respectively. Thus, it becomes difficult to perform sharing with other processor at a co-processor (computational resource) level or sharing of circuit resources (at a circuit level such as the computing unit and the register).

Then, the co-processor is tightly coupled to a co-processor IF (interface) for each processor locally. Thus, the co-processor specialized in a certain function cannot be used by other processor.

On the other hand, when the co-processors are arranged on the common bus, as shown in FIG. 12, all the processors can access the co-processors. Sharing of co-processor resources is thereby allowed. However, sharing of the co-processor resources is through the common bus that is also used for accesses to a shared memory and the peripheral IOs. Thus, when an access is made to a low-speed memory or a low-speed IO, bus traffic or a load tends to be influenced. For this reason, this configuration is inferior in real-time performance.

The invention is generally configured as follows.

In accordance with an aspect of the present invention, there is provided a multiprocessor apparatus that includes: a plurality of processors; a co-processor connected through a tightly coupled bus to at least one processors of the plurality of processors; and an arbitration circuit that arbitrates contention among a plurality of the processors inclusive of the at least one processor with respect to use of a resource in the co-processor through the tightly coupled bus. In the present invention, a co-processor is provided in common to a plurality of processors; and an arbitration circuit arbitrates contention among the processors with respect to use of a resource in the co-processor by the processors through a tightly coupled bus.

In the multiprocessor apparatus according to the present invention, there may be provided a plurality of co-processors provided corresponding to a plurality of processors, respectively; and an arbitration circuit for arbitrating contention for use of a resource in at least one of the co-processors by at least one of the processors and an other one of the processors through a tightly coupled bus, the at least one of the co-processors being provided corresponding to the at least one of the processors.

In the present invention, there may be provided first and second co-processors provided corresponding to first and second processors, respectively; a first an arbitration circuit for arbitrating contention for use of a resource in the first co-processor by the first and second processors through a first tightly coupled bus; and a second an arbitration circuit for arbitrating contention for use of a resource in the second co-processor by the first and second processors through a second tightly coupled bus. The first processor may be configured to be accessible to at least one of the resource in the first co-processor and the resource in the second co-processor through the tightly coupled bus. The second processor may be configured to be accessible to at least one of the resource in the first co-processor and the resources in the second co-processor through the tightly coupled bus.

The multiprocessor apparatus according to the present invention, may include: a co-processor connected to at least one of a plurality of processors through a tightly coupled bus, the processors connected to a common bus including at least one other processor connected to the co-processor through the common bus; and an arbitration circuit for arbitrating contention for use of a resource in the co-processor by the at least one of the processors through the tightly coupled bus and by the at least one other processor through the common bus.

In the present invention, there may be provided a multiplexer that receives signals from the processors; the multiplexer selecting a signal from one of the processors permitted by the arbitration circuit and supplying the signal to the co-processor.

In the present invention, the arbitration circuit may receive requests for use from the processors, and when contention for use of a resource in the co-processor by the processors occurs, the arbitration circuit may permit the use of the resource in the co-processor by one of the processors and may cause the use of the resource in the co-processor by the processors other than the one of the processors to be waited for.

In the present invention, the arbitration circuit may be connected to a common bus to which the processors are connected; and when contention for use of a resource in the co-processor by the processors is determined to occur based on signals output to the common bus from the processors, the arbitration circuit may permit the use of the resource in the co-processor by one of the processors and may cause the use of the resource in the co-processor by the processors other than the one of the processors to be waited for.

In the present invention, the co-processor may include at least one resource for which arbitration of use of resources among the processors is performed for each resource of the co-processor.

In the present invention, the co-processor may include: a plurality of resources; and a plurality of interfaces corresponding to the resources, respectively; and the resources may include at least one resource for which arbitration of use of the resources among the processors is performed for each resource.

In the present invention, a plurality of the resources in the co-processor may be simultaneously usable by a plurality of the processors through a plurality of the interfaces corresponding to the resources, respectively.

In the present invention, in each of the processors, processing of transmitting an instruction to the co-processor and receiving an execution result of the instruction by the co-processor through the tightly coupled bus may be performed; and the arbitration circuit may arbitrate use of the resource in the co-processor by the processors for each stage of an instruction pipeline.

According to the present invention, use of the co-processor through the tightly coupled bus other than the common bus for the processors is arbitrated. One co-processor can be thereby used by the processors, and a higher-speed operation than that when accesses are made through the common bus can also be thereby achieved, which make the present invention suitable for real-time processing.

Still other features and advantages of the present invention will become readily apparent to those skilled in this art from the following detailed description in conjunction with the accompanying drawings wherein examples of the invention are shown and described, simply by way of illustration of the mode contemplated of carrying out this invention. As will be realized, the invention is capable of other and different examples, and its several details are capable of modifications in various obvious respects, all without departing from the invention. Accordingly, the drawing and description are to be regarded as illustrative in nature, and not as restrictive.

BRIEF DESCRIPTIONS OF THE DRAWINGS

FIGS. 6A and 6B are diagrams for explaining presence or absence of access contention through a tightly coupled bus;

FIGS. 7A and 7B are diagrams for explaining presence or absence of access contention through a loosely coupled bus;

FIG. 8 is a diagram for explaining presence or absence of access contention through a tightly coupled bus;

PREFERRED MODES OF THE INVENTION

The present invention will be described in further detail with reference to drawings. According to the present invention, sharing of co-processor resources is implemented as well as sharing of a memory and a bus in a parallel processor system LSI. Operations using the co-processor may be performed in parallel. Only when a resource is contended for, arbitration is performed.

In each of the exemplary embodiments that will be described below, an example where the present invention has been applied to a multiprocessor (parallel processor) system will be described. To each of symmetrical or asymmetrical processors, a dedicated memory and a co-processor are connected through local buses different from a common bus. The co-processor supports the processor by taking charge of specific processing (audio, video, or wireless processing, or an arithmetic operation of an FFT or the like). Alternatively, the co-processor may be a hardware accelerator. In the following exemplary embodiments, the co-processor is shared by the parallel processors, and an arbitration circuit that arbitrates accesses to the tightly-coupled co-processor is provided.

FIRST EXAMPLE

Figure 1:
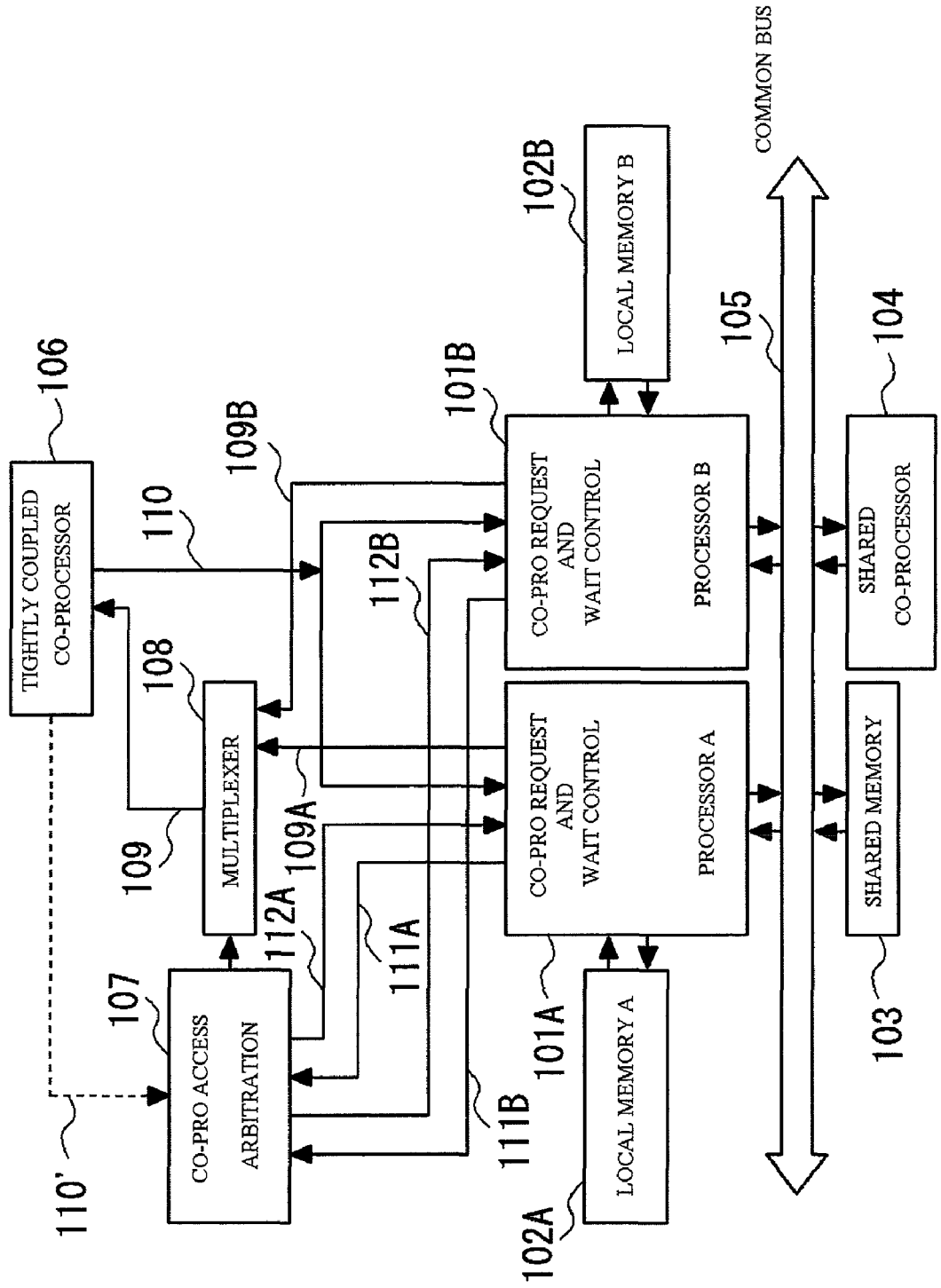
FIG. 1 is a drawing showing a configuration of a first exemplary embodiment of the present invention.

FIG. 1 is a diagram showing a configuration of a first example of the present invention. In this example, a co-processor 106 is tightly coupled to a local bus of each processor. The co-processor 106 that is tightly coupled to the local bus is also referred to as a "tightly coupled co-processor". When requests to use a resource in the co-processor 106 from the processors 101A and 101B are overlapped (when contention for use of the resource in the co-processor 106 occurs), an arbitration circuit (co-pro access arbitration circuit) 107 arbitrates the contention. The arbitration circuit 107 permits a request for use from one of the processors and causes the other of the processors to wait for use.

More specifically, a request 111A to use the co-processor 106 from the processor 101A and a request 111B to use the co-processor 106 from the processor 101B are input to the arbitration circuit 107. Then, signals 112A and 112B indicating permission to use/wait are supplied from the arbitration circuit 107 to the processors 101A and 101B, respectively. When the requests to use a computational resource in the co-processor 106 from the processors 101A and 101B are overlapped, the arbitration circuit 107 permits use by one of the processors, and causes use by the other of the processors to be waited for.

A multiplexer 108 receives commands (instructions) transferred from the processors 101A and 101B through signal lines 109A and 109B, respectively. Based on a result of arbitration by the arbitration circuit 107, the multiplexer 108 sends to the co-processor 106 a command (instruction) from the processor for which use of the co-processor 106 has been permitted, through a signal line 109. The co-processor 106 returns a result of execution (response) of the instruction to the processor through a signal line 110.

The arbitration circuit 107 may receive a state of the co-processor 106 (such as a usage state of a circuit resource, a pipeline status, and the like) from the co-processor 106 through a signal line 110'. Then, the arbitration circuit 107 may check the state of the co-processor 106 against the requests 111A and 111B to use the co-processor 106 respectively received from the processors 101A and 101B. When there will be no resource contention, the requests may be simultaneously executed in parallel. When the arbitration circuit 107 receives a request for use from the processor 101B while the processor 101A is using a certain resource in the co-processor 106, the arbitration circuit 107 gives permission for use to the request to use the co-processor 106 from the processor 101B, if a resource in the co-processor 106 to be used according to the request for use from the processor 101B and the resource in the co-processor 106 being used according to the request for use from the processor 101A do not contend with each other.

The respective signal lines 109, 109A, 109B, 110, and 110' may be parallel lines each having a width of plural bits, or may be one-bit serial lines. The signal lines 109, 109A, and 109B, and the signal lines 110 and 110' each constitute the local bus (tightly coupled bus) of the processor.

In this example, the co-processor 106 is tightly coupled through the multiplexer 108 disposed on the local buses of the processor 101A and 101B. Tightly connected bus has a bus protocol in which a command (co-processor instruction) from each of the processors 101A and 101B is transferred to the co-processor 106, the co-processor 106 executes the command (co-processor instruction), and a result of execution is transferred to each processor. On the other hand, in a loosely coupled bus such as a common bus, an address signal, a control signal (for a read/write), and data signal are transferred on the bus, from a bus master (processor) that has acquired a right to use the bus. FIG. 1 shows the configuration with two processors, which are the processors 101A and 101B, only for simplicity. The number of the processors is not of course limited to two in the present invention.

According to this example, computational resources in the co-processor 106 tightly coupled to the local bus of the processor may be shared between the processors 101A and 101B, and sharing of the computational resources of the co-processor 106 and high-speed access using tight coupling can be thereby both achieved.

The command sent from each of the processors 101A and 101B to the co-processor 106 may be an instruction (or a part of the instruction such as a partly decoded code), or a macro instruction (instruction defined by a group of a plurality of instructions for an FFT, for example). When the co-processor 106 is composed of pipelines, the co-processor 106 that has received a co-processor instruction transferred from the processor may start with an instruction decode (DE) stage. Then, a result of an operation executed in an operation executing (EX) stage may be returned to the processor.

Next, referring to FIG. 6, arbitration of accesses to the co-processor through a tightly coupled bus in this example will be described. Though no particular limitation is imposed on the present invention, an information pipeline in this example includes five stages: an instruction fetch (IF) stage, a decode (DE) stage, an operation executing (EX) stage, a memory access (ME) stage, and a result storage (WB) stage. In the case of a load instruction, for example, address calculation is performed in the EX stage. Data is read from a data memory in the ME stage. Then, read data is written to a register in the WB stage. In the case of a store instruction, address calculation is performed in the EX stage. Data is written to the data memory in the ME stage. Then, no operation is performed in the WB stage.

Referring to FIG. 6A, the processor A fetches an instruction from the local memory (or an instruction memory included in the processor A) (in the (IF) stage). Then, when the fetched instruction is determined to be a co-processor instruction in the decode (DE) stage, the processor A outputs a request to use the co-processor to the arbitration circuit (indicated by reference numeral 107 in FIG. 1) in order to cause the instruction to be executed by the co-processor. When the processor A receives from the arbitration circuit permission to use the co-processor, the processor A transmits the instruction to the co-processor. The co-processor executes respective stages of decoding (COP DE), instruction execution (COP EX), and memory access (COP ME) of the instruction received from the processor A. Then, the write-back (WB) stage by the processor A is executed. Though no particular limitation is imposed on the present invention, in the memory access (COP ME) stage of the co-processor, an execution result of the instruction by the co-processor may be transferred to the processor A through the local bus of the processor A, and may be written to the register in the processor A in the write-back (WB) stage of the processor A. In this case, the processor A receives the operation result from the co-processor instead of the data memory, and stores the result in the register in the WB stage. In an example shown in FIG. 6A, the instruction pipeline stages (DE, EX, ME) of each processor are synchronized with the instruction pipeline stages (COP DE, COP EX, COP ME) of the co-processor that executes the co-processor instruction issued by the processor. Operating frequencies for the co-processor and the processor may be of course different. Alternatively, the co-processor may operate asynchronously with the processor, and when the co-processor finishes an operation, a READY signal may be notified to the processor.

The processor B also causes respective stages of decoding (COP DE), instruction execution (COP EX), and memory access (COP ME) of an instruction to be executed by the co-processor. In this case, the arbitration circuit (indicated by reference numeral 107 in FIG. 1) causes the processor B to be in a wait state during a period corresponding to the decode (DE) stage of the co-processor instruction (corresponding to the DE stage of the co-processor instruction issued by the processor A), and the decode (DE) stage of the co-processor instruction issued by the processor B is stalled. Then, waiting is released. The processor B receives permission to use (release of the waiting) from the arbitration circuit, and transmits the instruction to the co-processor. The co-processor sequentially executes the respective stages of decoding (COP DE), instruction execution (COP EX), and memory access (COP ME) of the instruction received from the processor B. Then, the write-back (WB) stage by the processor B is executed.

FIG. 6A shows the example where contention for a circuit resource occurs in the instruction decode (DE) stage of the co-processor (e.g. where the co-processor instructions simultaneously issued by the processors A and B are the same). An object, access contention of which is subjected to arbitration is not limited to the instruction decode (DE) stage. When contention for a circuit resource in the co-processor occurs in each of the operation executing (EX) stage and the memory access (ME) stage, use of the circuit resource in the co-processor by the processor other than the processor in which the use is permitted is set to the wait state.

On the other hand, when there is no access contention for a circuit resource in co-processor instructions issued by the processors A and B, respectively, the WAIT signal remains inactive (LOW), as shown in FIG. 6B. In the co-processor, pipeline stages from the decode (DE) stages to the memory access (ME) stages of the co-processor instructions from the processors A and B are simultaneously executed. Though no limitation is imposed on the present invention, in the examples in FIGS. 6A and 6B, the co-processor 106 may have a configuration in which two pipelines are included, thereby allowing simultaneous issuance of two instructions.

In this example, adjustment of contention for a circuit resource in the co-processor tightly coupled to the processors is made for each instruction pipeline stage. To the arbitration circuit 107 in FIG. 1, information on a pipeline stage progress (current stage) of the co-processor 106 is notified through the signal line 110', for example. The arbitration circuit 107 performs control of monitoring use of a corresponding resource and determining whether contention will occur in the resource requested to use. That is, it may be so arranged that a signal indicating a pipeline status of the co-processor 106 or the like is transferred to the tightly coupled bus from the co-processor 106. In this case, the pipeline status or the like is notified to the processors 101A and 101B through the signal line 110.

The arbitration circuit 107 that arbitrates contention for a resource through the tightly coupled bus performs arbitration of resource contention for each pipeline stage. The arbitration of contention for a resource in the co-processor 106 among the processors may be of course performed for each instruction cycle, rather than each pipeline stage.

FIGS. 7A and 7B are diagrams showing instruction pipeline transitions when the processors are connected to the co-processor through the loosely coupled bus such as the common bus, as comparative examples.

When each processor delivers an instruction to the co-processor through the loosely coupled bus such as the common bus, the instruction is delivered to the co-processor in the memory access (ME) stage of the instruction pipeline of the processor. In a latter half of the memory access (ME) stage of the processor, decoding (COP DE) of the instruction is performed in the co-processor. In a cycle corresponding to the write back (WB) state of the processor, the operation executing (EX) stage of the co-processor is executed, and then, the memory access (COP ME) stage is executed. Though no particular limitation is imposed, in the memory access (COP ME) stage of the co-processor, data transfer from the co-processor to the processor is made. In examples shown in FIGS. 7A and 7B, the speed of a bus cycle of the loosely coupled bus such as the common bus is low. Thus, a stall period occurs in the processor pipeline by a bus access. During a period corresponding to the memory access (COP ME) stage of the co-processor, a vacancy of the processor pipeline is generated.

When the memory access (ME) stages of the processors A and B contend as shown in FIG. 7A, the memory access (ME) stage of the processor B (accordingly, the DE stage where the co-processor instruction is transferred to the co-processor and the co-processor decodes the co-processor instruction) is brought into the wait state (standby state) until the stages of decoding (COP DE), instruction execution (COP EX), and memory access (COP ME) of the co-processor instruction issued by the processor A are completed in the co-processor. That is, in the loosely coupled bus such as the common bus, the memory access (COP ME) stage of the co-processor that executes the instruction issued by the processor A and the memory access (ME) stage of the processor B contend for a resource through the bus. Thus, the memory access (ME) stage of the processor B is stalled until the stages of decoding (COP DE), instruction execution (COP EX), and memory access (COP ME) of the instruction issued by the processor A are completed.

After completion of the memory access (COP ME) stage of the instruction issued by the processor A in the co-processor, waiting of the memory access (ME) stage of the processor B is released. Upon receipt of this release, the co-processor instruction issued by the processor B is transferred to the co-processor. Then, in the co-processor, respective stages of decoding (COP DE), execution (COP EX), and memory access (COP ME) of the co-processor instruction issued by the processor B are sequentially executed.

Where there is no access contention for a circuit resource in co-processor instructions issued from the processors A and B, a wait (WAIT) signal remains inactive (LOW), as shown in FIG. 7B. In an example shown in FIG. 7B, for the processor B, the instruction fetch (IF), decode (DE), and executing (EX) stages are executed in the memory access (ME) stage of the processor A. Following the memory access (ME) stage of the processor A, the memory access (ME) stage of the processor B is executed. That is, in the co-processor, following the memory access (COP ME) of an instruction issued by the processor A, decoding (COP DE) of an instruction issued by the processor B is performed.

In the case of the tightly coupled bus shown in FIG. 6A, a period (of delay) where the pipeline is stalled at a time of access contention is the period corresponding to one stage of the pipeline (which is the DE stage in FIG. 6A), for example. On contrast therewith, in the case of the loosely coupled bus in FIG. 7A, a period where the ME stage of the processor is stalled when access contention occurs is long. Especially when the speed of the bus cycle is low, the period where the ME stage is stalled is increased, thereby causing a stall period of the pipeline. In the case of the tightly coupled bus shown in FIG. 6A, a stall (vacancy) of the pipeline does not occur.

FIG. 8 is a diagram for explaining a case where co-processor instructions each with a plurality of cycles contend in the configuration that uses the co-processor in this example. That is, FIG. 8 shows the case where the co-processor instructions each with the plurality of cycles contend in the pipelines to be executed by the co-processor. When an access to a resource to be used by a co-processor instruction from the processor B contends with pipeline operation executing stages (COP EX1 to EX5) in the co-processor that executes a co-processor instruction issued by the processor A, the WAIT signal is output from the arbitration circuit (indicated by reference numeral 107 in FIG. 1) to the processor B in this period. The decode (DE) stage of the co-processor instruction issued by the processor B in the co-processor is stalled. After completion of the operation executing stage (COP EX5) of the co-processor instruction issued by the processor A in the co-processor, the operation executing stages (COP EX1 to EX5) and the memory access (COP ME) stage of the co-processor instruction issued by the processor B are executed.

In this example, a description was given about the examples where arbitration (arbitration) control over resource contention is performed for each instruction pipeline stage. The arbitration may be performed for each instruction cycle, or access arbitration may be performed for every plurality of instructions, based on access contention for a resource.

SECOND EXAMPLE

Figure 2:
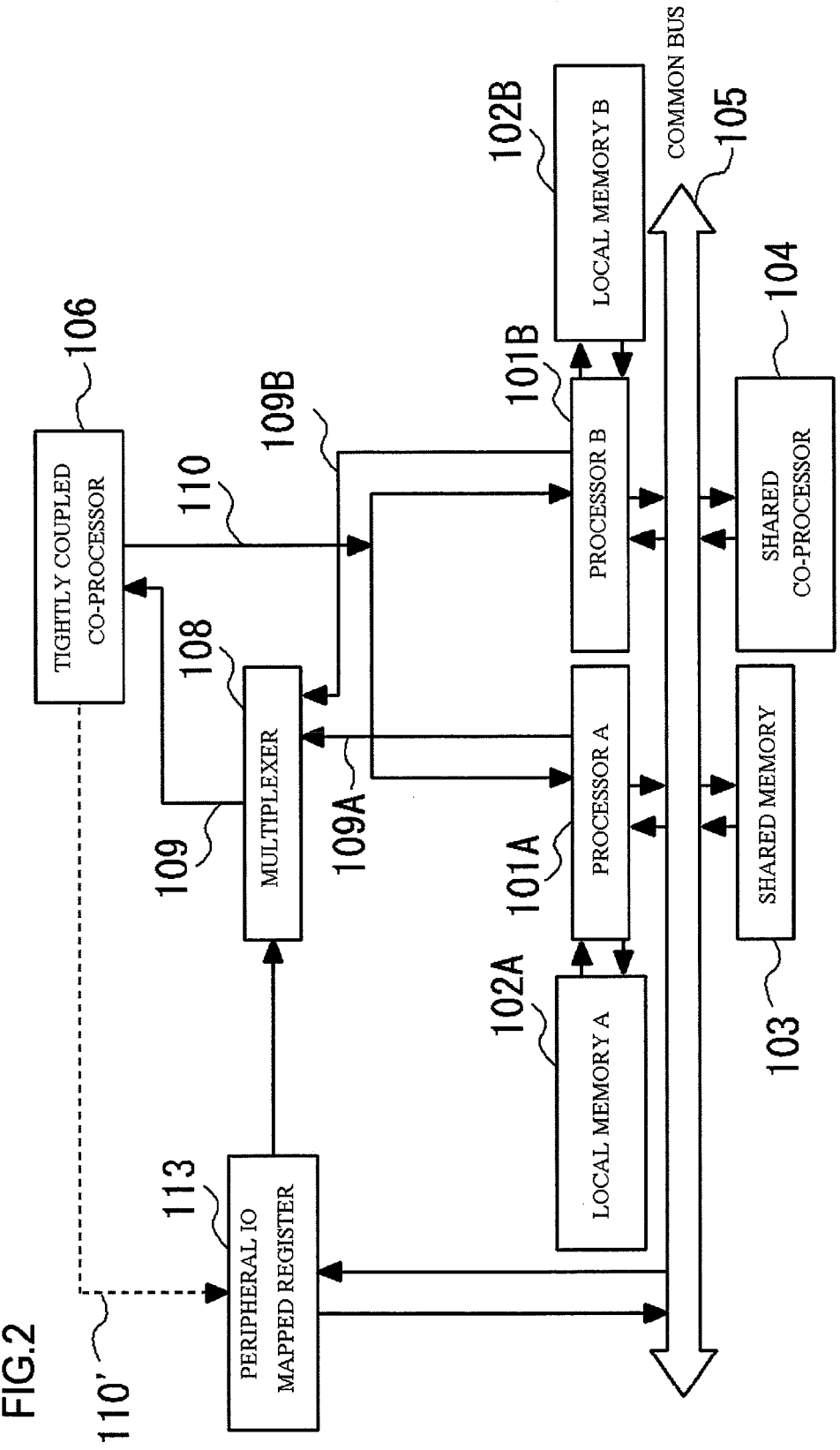
FIG. 2 is a drawing showing a configuration of a second exemplary embodiment of the present invention.

Next, a second example of the present invention will be described. FIG. 2 is a diagram showing a configuration of the second example of the present invention. In this example, arbitration by software control among processors rather than by hardware such as the arbitration circuit in the first example shown in FIG. 1 is performed.

A multiplexer 108 that switches connection among a co-processor (tightly coupled co-processor) 106, a processor 101A, and a processor 101B is controlled by a register (peripheral IO mapped register) 113 mapped in a peripheral IO space. More specifically, each of the processors 101A and 101B accesses the register 113 using an access address (IO address) to a common bus 105. When other processor is not using the tightly coupled co-processor 106, a request for use is set in the register 113. Then, an instruction from the processor that has made a request for use is selected by the multiplexer 108 and is then transmitted to the co-processor 106. While one processor is using the co-processor 106, access to the co-processor 106 by other processor is locked. When a value of the register 113 indicates that the other processor is using the co-processor 106, use of the co-processor 106 is waited for until the other processor releases the co-processor 106. The register 113 implements a semaphore flag for implementing exclusive control over the co-processor 106. Simultaneous use of the co-processor by the processors 101A and 101B cannot be made. Granularity of the exclusive control may be set for each instruction pipeline stage.

In this example, the co-processor 106 tightly coupled to the local buses of the processors can be shared between the processors 101A and 101B. Sharing of computational resources of the co-processor and high-speed access using tight coupling can be thereby both achieved.

Though no particular limitation is imposed on the present invention, the co-processor 106 may be a dedicated co-processor specialized in AAC (Advanced Audio Coding) decoding processing, for example. In the configuration where the processor 101A is a 300-MIPS (Mega Instructions Per Second)-class DSP (Digital Signal Processor) and the processor 101B is a 50-MIPS-class DSP, the processor 101B performs the AAC decoding processing when more capacity is left in terms of necessary processing MIPS. On the other hand, when a video system is added, and when the processor 101B does not have sufficient performance, the processor 101 A performs video system processing and audio system processing. In this case, the processor 101A accesses the co-processor for audio use. By changing the DSP to be used as described above, optimization of power consumption may be performed.

THIRD EXAMPLE

Figure 3:
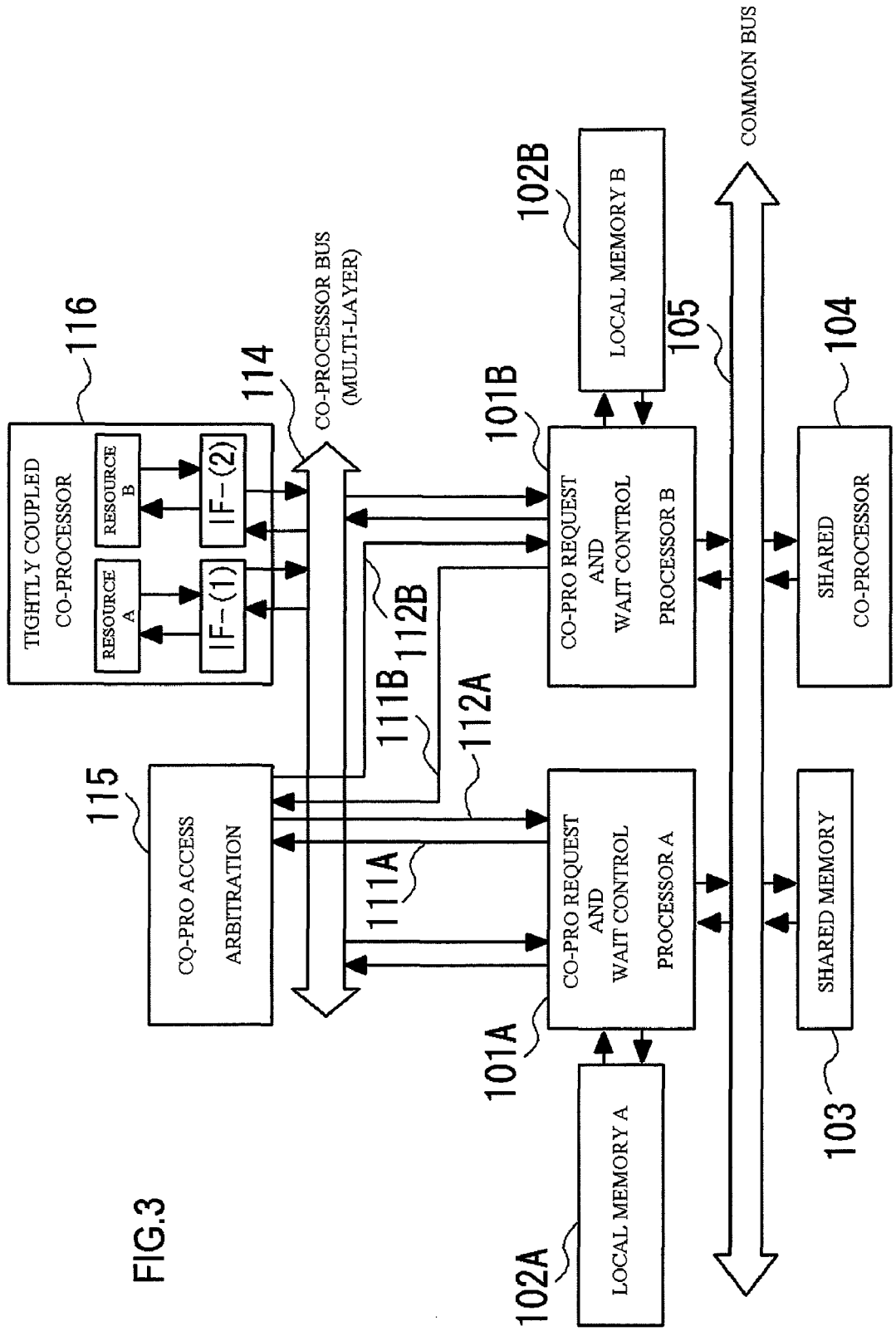
FIG. 3 is a diagram showing a configuration of a third exemplary embodiment of the present invention.

Next, a third example of the present invention will be described. FIG. 3 is a diagram showing a configuration of the third example of the present invention. Referring to FIG. 3, a co-processor (tightly coupled co-processor) 116 includes a first co-processor bus interface IF-(1) and a second co-processor bus interface IF-(2), and is connected to a multi-layer co-processor bus 114. The multi-layer co-processor bus 114 is the bus that allows simultaneous accesses from a plurality of processors.

Accesses to resources A and B in the co-processor 116 can be made through different layers of the co-processor bus 114, respectively. Thus, even when requests to use the co-processor 106 overlap between the processors 101A and 101B, the requests will not contend if destinations of the requests are the resources A and the resources B, which are different, thereby allowing simultaneous use of the co-processor 106.

When requests to use contend for the same resource A or B in the co-processor 116, the arbitration circuit (co-pro access arbitration circuit) 115 causes one of the processors to be waited for. To the co-processor bus 114, status information on the co-processor 116 (such as a pipeline state and a resource usage status) is transferred through the interfaces IF (1) and IF(2). The arbitration circuit 115 monitors and manages information on use of the resources A and B in the co-processor 116 by the processor of which use is currently permitted. Based on the requests to use 111A and 111B from the processors, the arbitration circuit 115 determines whether resource contention is present or not.

In this example, the processors 101A and 101B can individually access a resource (a circuit resource such as a computing unit) in the co-processor 116. Thus, efficient utilization (simultaneous use) of the resource at the granularity of a finer circuit block level is made possible.

Though no particular limitation is imposed on the present invention, the resource A in the co-processor 116 may perform Huffman decoding processing, and the resource B may perform IMDCT (Inverse Modified Discrete Cosine Transform) processing, for example. In the resources A and B in the co-processor 116, both of MP3 (MPEG1 Audio Layer-3) processing and AAC processing can be used. When the processor 101A performs MP3 decoding processing and the processor 101B performs AAC decoding processing, the processors 101A and 101B access the resources A and B in the co-processor 116, respectively, thereby performing decoding processing in accordance with the MP3 standard and the ACC standard, respectively. Simultaneous decoding processing in accordance with the MP3 standard and the AAC standard are used for overlap (cross-fading) processing of fade-out and fade-in between pieces in a playlist mixed with the MP3 format and the AAC format.

FOURTH EXAMPLE

Figure 4:
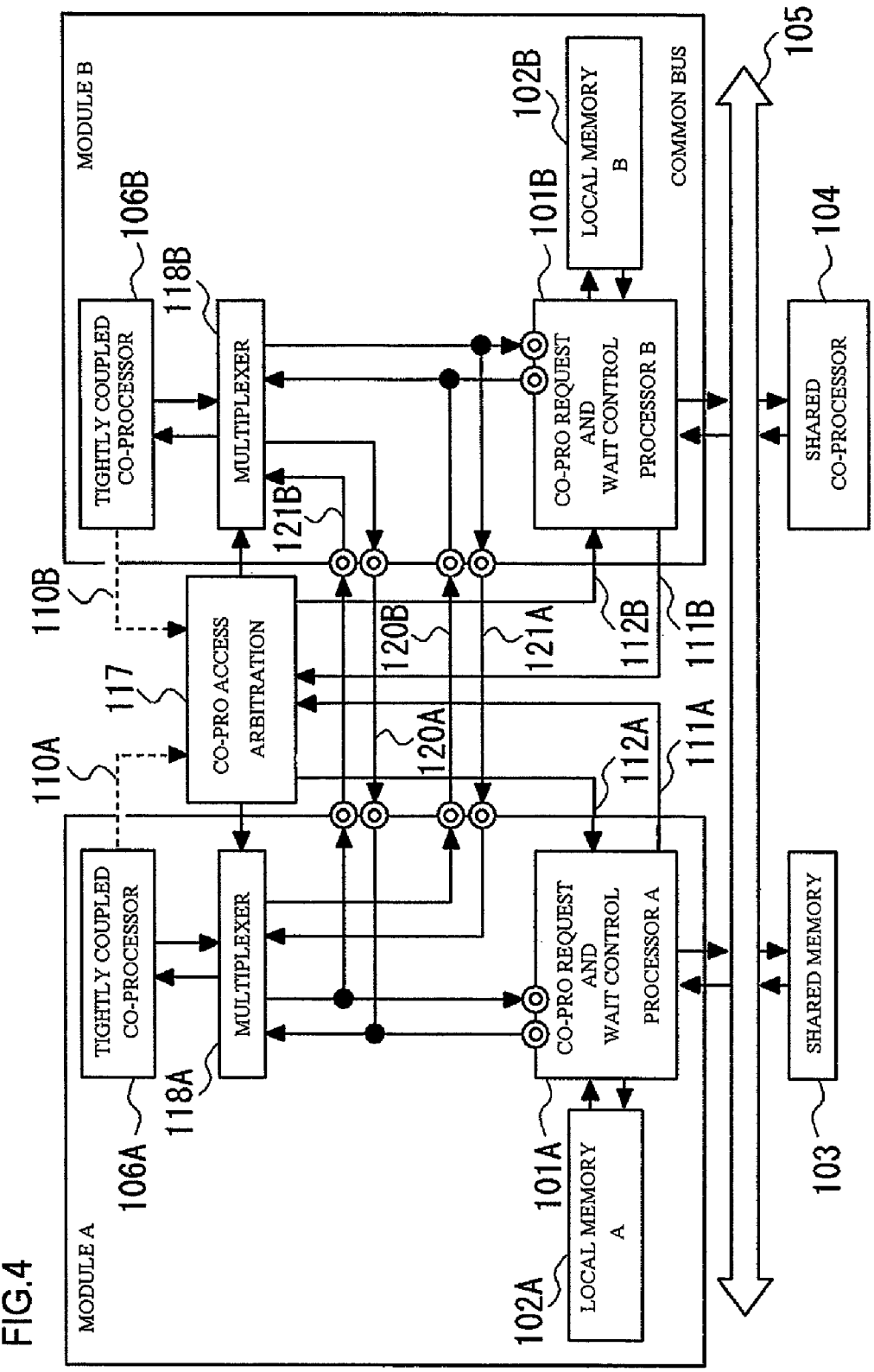
FIG. 4 is a diagram showing a configuration of a fourth exemplary embodiment of the present invention.

Next, a fourth example of the present invention will be described. FIG. 4 is a diagram showing a configuration of the fourth example of the present invention. Referring to FIG. 4, in this example, modules A and B are connected to a common bus 105. The module A includes a processor 101A, a local memory 102A, a co-processor 106A, and a multiplexer 118A. The module B includes a processor 101B, a local memory 102B, a co-processor 106B, and a multiplexer 118B. This example further includes an arbitration circuit (co-processor access arbitration circuit) 117.

The arbitration circuit 117 receives requests for use from the processors 101A and 101B. When accesses contend, the arbitration circuit 117 gives one of the processors permission to use and causes the other of the processors to WAIT. The arbitration circuit 117 notifies the multiplexer 118A or 118B of the processor to which the arbitration circuit 117 has given permission to use. The processors 101A and 101B respectively specify in requests for use 111A and 111B which one of the modules A and B is to be used. Respective statuses (pipeline statuses) of the co-processors 106A and 106B may be notified to the arbitration circuit 117 through signal lines 110A and 110B, respectively.

The module A formed of the processor 101A, co-processor 106A, and local memory 102A includes an interface 121A that allows access to the co-processor 106A in the module A from outside of the module and an interface 120A for accessing the co-processor 106B which is outside of the module A. The module B includes an interface 121B that allows access to the co-processor 106B in the module B from outside of the module B and an interface 120B for accessing the co-processor 106A which is outside of the module B. Though no particular limitation is imposed on the present invention, the module A or B may be formed of a reusable IP macro.

The multiplexer 118A delivers an instruction from a selected one of the processors 101A and 101B to the co-processor 106A, and returns a result of processing by the co-processor 106A to the processor 101A or 101B that has issued the instruction.

The multiplexer 118B delivers an instruction from a selected one of the processors 101A and 101B to the co-processor 106B, and returns a result of processing by the co-processor 106B to the processor 101A or 101B that has issued the instruction.

By accessing the co-processor in the other module through the interface 120 or 121, each co-processor is shared between the parallel processors.

According to this example, the co-processor in each module such as a reusable IP can be shared by the parallel processors. Further, a co-processor specialized in a certain function can be used by other processor.

By providing the interface for connecting the co-processor in and outside each module even when a circuit such as the reusable IP is fixed, reusability of a circuit resource (in the co-processor) inside the reusable IP can be enhanced.

It is assumed that the module A is an IP specialized in MP3 decoding, for example, and the module A includes a 32×32 multiplier within the co-processor 106A and can execute an instruction for each 32×32 multiplication. It is assumed that the module B is an IP dedicated to AAC decoding and the module B includes a 32×16 multiplier within the co-processor 106B and can execute an instruction for each 32×16 multiplication. When MP3 decoding is performed by the module A and WMA (Windows (registered mark) Media Audio) decoding is additionally performed by the module B at the same time, the processor 101B in the module B that needs the 32×32 multiplication uses the co-processor A (32× 32 multiplier) within the module A through the interfaces 120B and 120A.

FIFTH EXAMPLE

Figure 5:
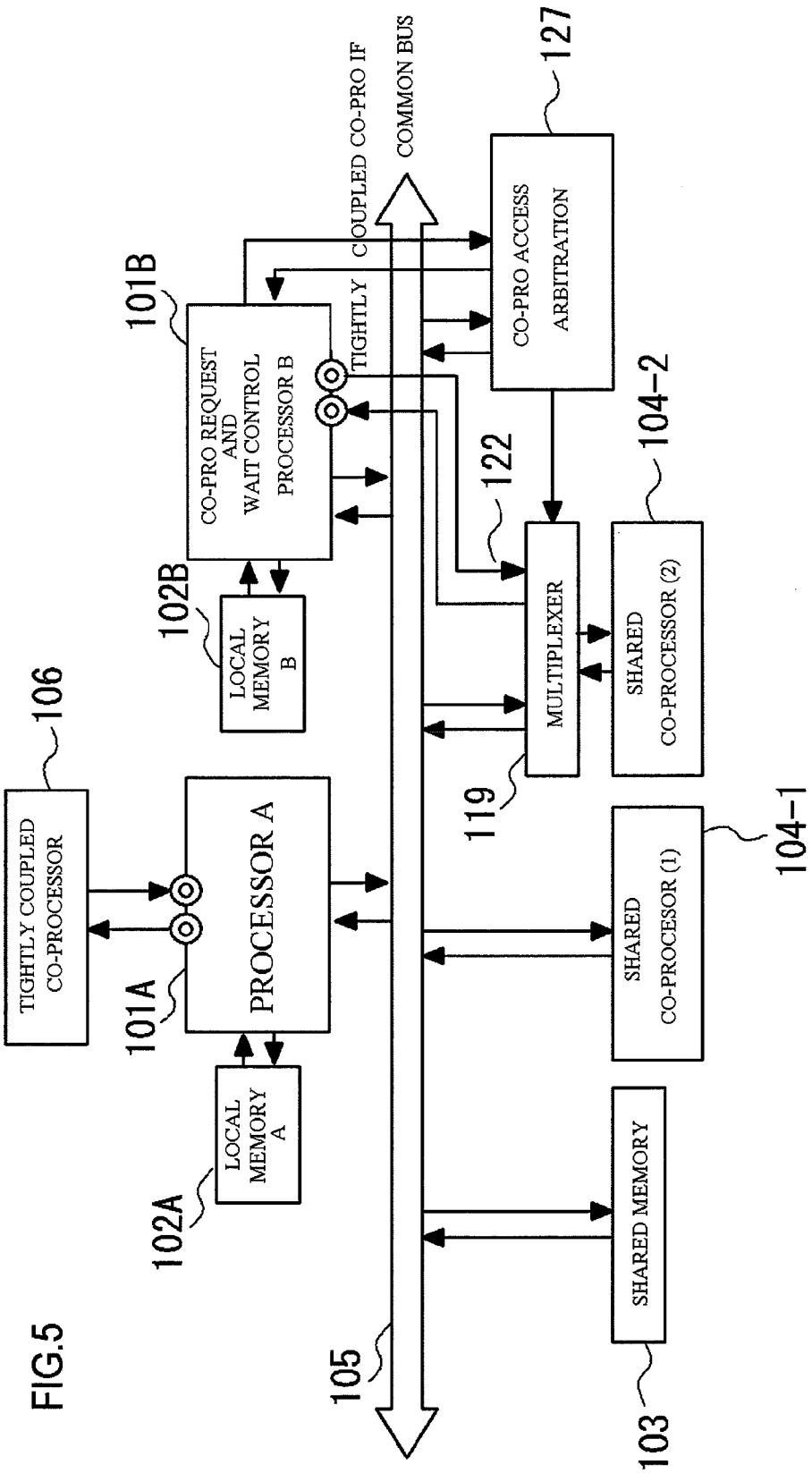
FIG. 5 is a diagram showing a configuration of a fifth exemplary embodiment of the present invention.
Figure 9:
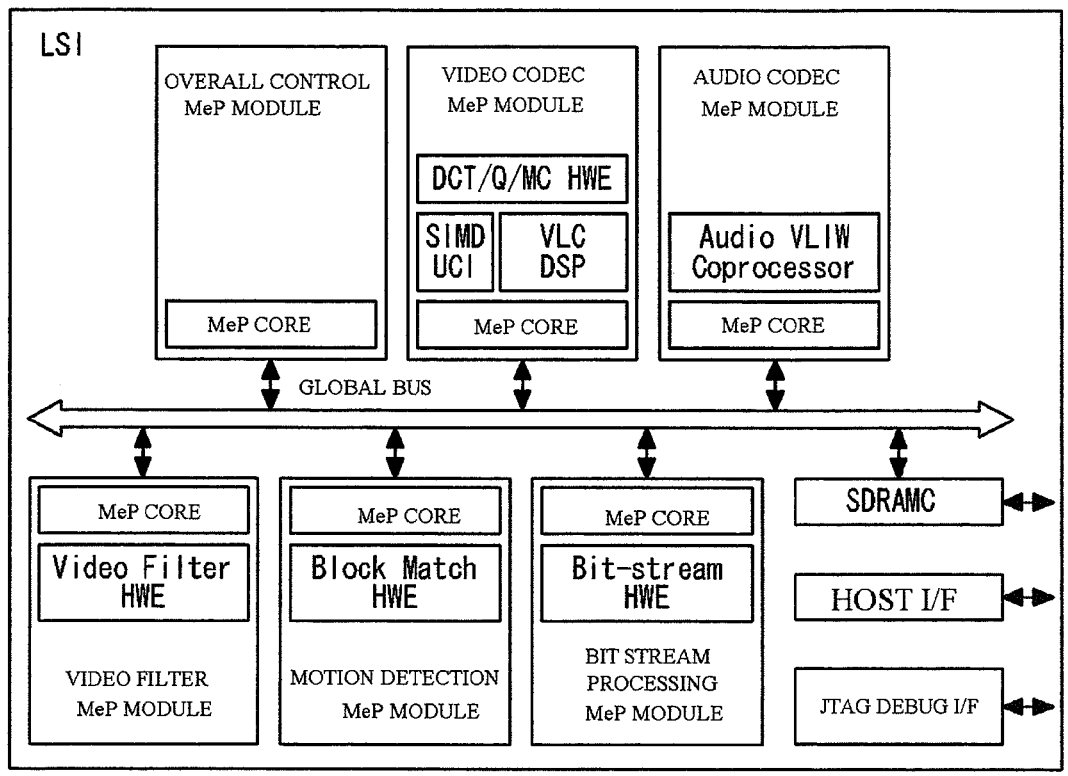
FIG. 9 is a diagram showing a configuration of a related art.
Figure 10:
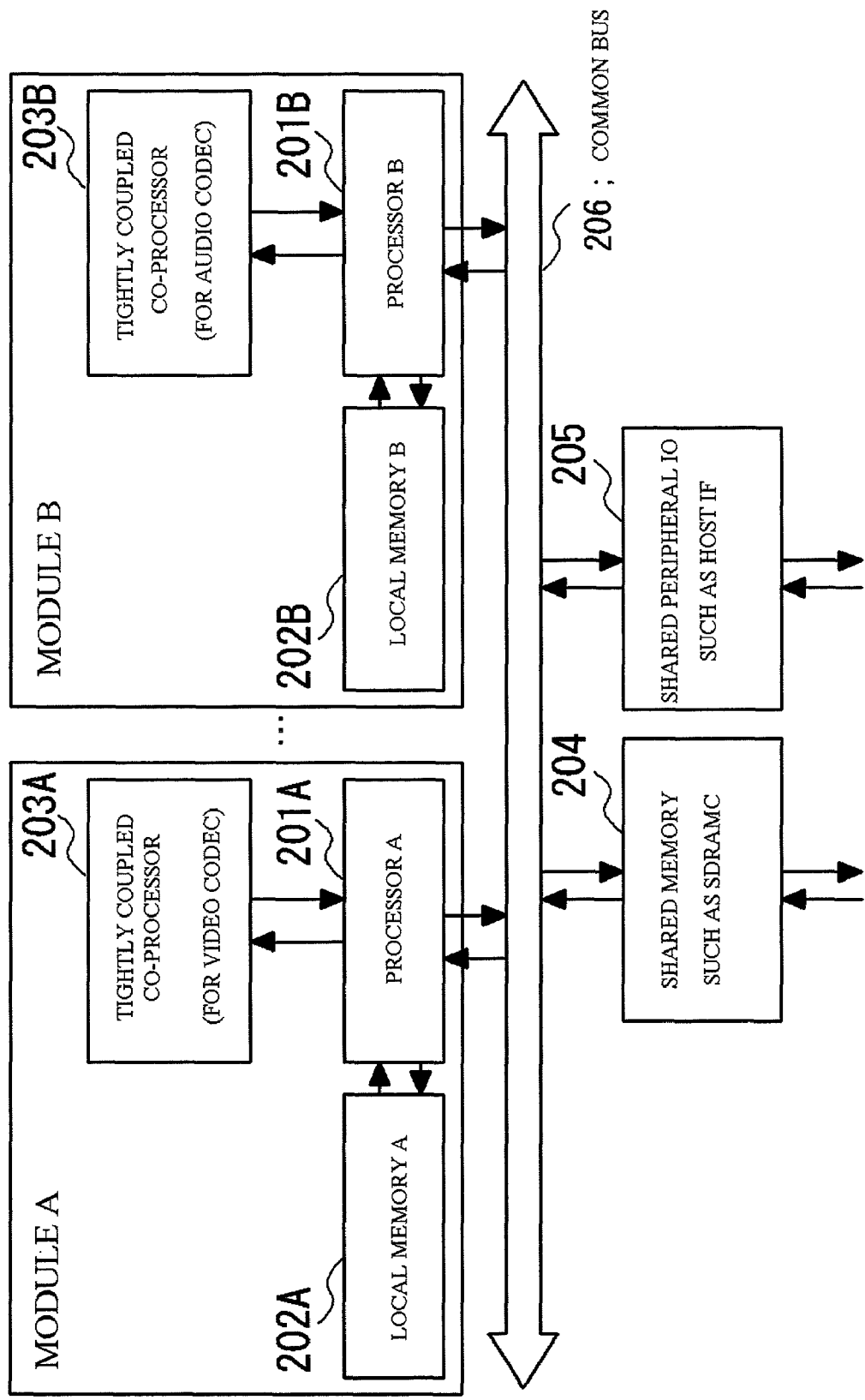
FIG. 10 is a diagram explaining the configuration in FIG. 9.
Figure 11:
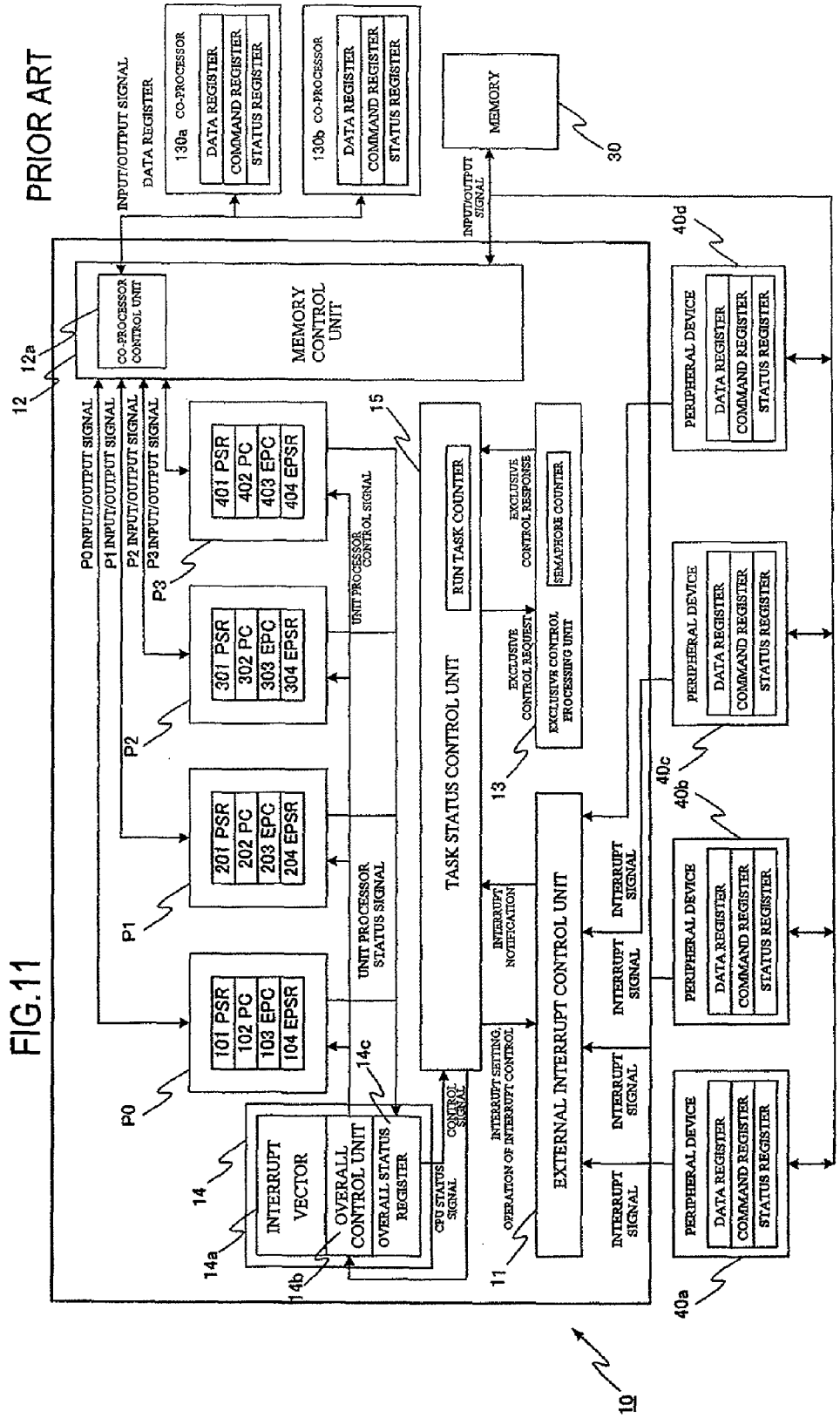
FIG. 11 is a diagram showing a configuration of a related art.
Figure 12:
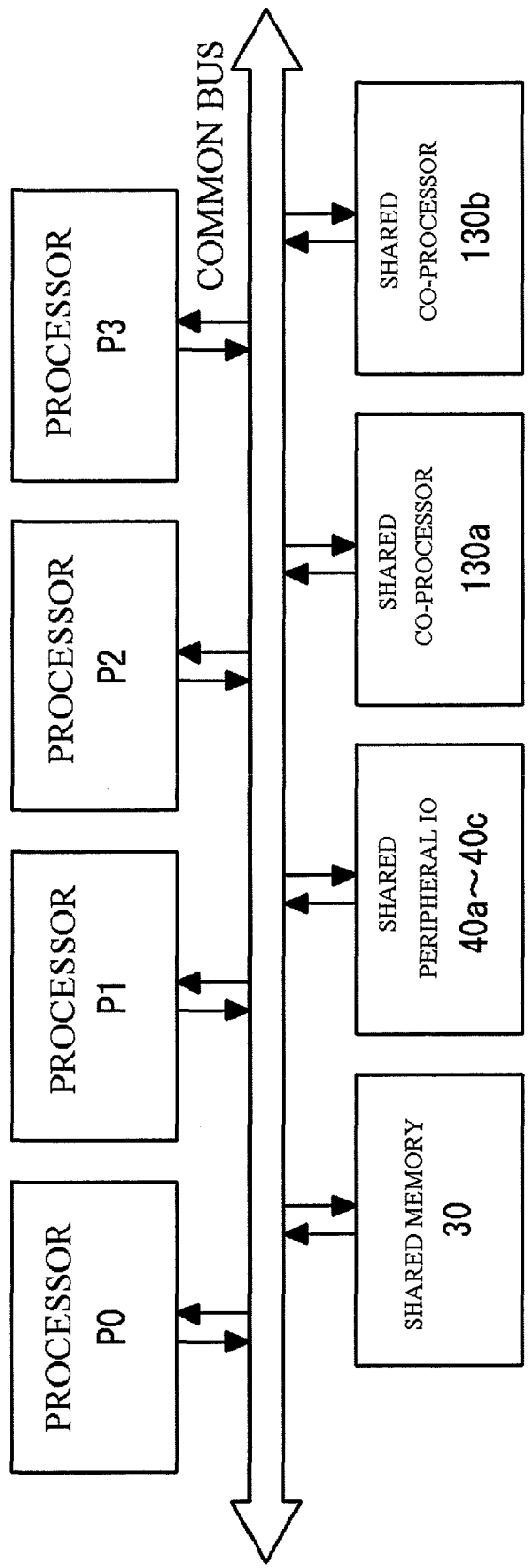
FIG. 12 is a diagram explaining the configuration in FIG. 11.

Next, a fifth example of the present invention will be described. FIG. 5 is a diagram showing a configuration of the fifth example of the present invention. Referring to FIG. 5, in this example, a shared co-processor (2) 104-2 on a common bus 105 is connected to the common bus 105 and a tightly-coupled co-processor interface (IF) 122 of the processor 101B through a multiplexer 119. A processor 101B can access a shared co-processor (2) 104-2 through the co-processor interface (IF) 122, not through the common bus 105.

In this example, when an arbitration circuit (co-processor access arbitration circuit) 127 permits a request for use from the processor 101B, the multiplexer 119 selects the tightly coupled co-processor interface 122, and connects the processor 101B to the shared co-processor 104-2. The shared co-processor 104-2 functions as a tightly coupled co-processor for the processor 101B.

On the other hand, when the arbitration circuit 127 permits a request for use from a processor 101A, the multiplexer 119 selects the common bus 105. Then, the processor 101A accesses the co-processor 104-2 through the common bus 105. In this example, the processor 101B may of course access the shared co-processor 104-2 according to the bus protocol of the common bus 105 without outputting a request for use of the co-processor 104-2 to the arbitration circuit 127.

According to this example, high-speed access to the co-processor 104-2 connected to the common bus 105 through tight coupling can be made. Further, the co-processor 104-2 can be accessed through connection (loose coupling) using the common bus 105.

An operation and effect of the respective examples described above will be described.

According to the first and second examples, the co-processor tightly coupled to the local bus of the processor can be shared between parallel processors. Sharing of the computational resources (in the co-processor) and high-speed access using tight coupling can be thereby both achieved.

According to the third example, a circuit resource (such as the computing unit) in the tightly coupled co-processor can be individually accessed by the plurality of processors. Efficient utilization (simultaneous use) of the resource at the granularity of a finer circuit block level thereby becomes possible.

According to the fourth example, the co-processor in each module such as a reusable IP can be shared by parallel processors. Further, the co-processor specialized in a certain function can be used by other processor. By providing the interface for connecting the co-processor in and outside each module even when the circuit such as the reusable IP is fixed, reusability of a circuit resource (in the co-processor) inside the reusable IP can be enhanced.

According to the fifth example, access to the co-processor on the common bus through tightly coupling can be made. An advantage that access (sharing) by all the processors using common bus connection (loose coupling) can be made and an advantage of high-speed access through tight coupling can be both obtained.

Respective disclosures of Patent Document and Nonpatent Document described above are incorporated herein by reference. Within the scope of all disclosures (including claims) of the present invention, and further, based on the basic technical concept of the present invention, modification and adjustment of the example and the examples are possible. Further, within the scope of the claims of the present invention, a variety of combinations or selection of various disclosed elements are possible. That is, the present invention of course includes various variations and modifications that could be made by those skilled in the art according to all the disclosures including the claims and the technical concept.

What is claimed is:

1. A multiprocessor apparatus comprising:
a plurality of processors coupled to a common bus to access a predetermined device which is coupled to the common bus, and further coupled to local buses thereof, which are different buses from the common bus, to transfer commands therethrough and to output requests for use;
a co-processor coupled to the local buses thereof to receive the commands, to execute the commands by using resources in the co-processor, and to return results of execution of the commands to the processors through the local buses, wherein the co-processor outputs a resource status information representing a usage state of the resources in the co-processor;
an arbitration circuit coupled to the processors to receive the requests therefrom and configured to arbitrate the requests to output a permission signal thereto which indicates permitting the respective processors simultaneously to use the resources in the co-processor, if the respective processors output the requests simultaneously among the respective processors but the resources to be used by the respective processors do not contend with each other, wherein the arbitration circuit receives the resource status information from the co-processor and the permission signal is based on the resource status information; and
a multiplexer coupled to the arbitration circuit, coupled to the processors through the local buses, and coupled to the co-processor through the local buses to transfer the commands received from the respective processors to the co-processor in accordance with the permission signal,
wherein the multiplexer receives the commands from the plurality of processors through the local buses, receives the permission signal from the arbitration circuit, selects from one of the plurality of processors based on the permission signal and supplies the commands from the selected one of the plurality of processors to the co-processor through the local buses.

2. The multiprocessor apparatus according to claim 1, comprising
a plurality of co-processors provided in correspondence with the plurality of processors, respectively, the plurality of processors being coupled to the plurality of co-processors through the tightly coupled local buses, respectively; wherein
the arbitration circuit arbitrates contention for use of a resource in at least one co-processor corresponding to at least one processor of the plurality of processors through a tightly coupled local bus among the local buses corresponding to the at least one processor by the at least one processor and an other processor of the plurality of processors.

3. The multiprocessor apparatus according to claim 2, wherein
the plurality of processors includes first and second processors;
the plurality of co-processors includes first and second co-processors provided in correspondence with the first and second processors, respectively; wherein the arbitration circuit comprises:
a first an arbitration circuit that arbitrates contention for use of a resource in the first co-processor through a first tightly coupled local bus by the first and second processors; and
a second an arbitration circuit that arbitrates contention for use of a resource in the second co-processor by the first and second processors through a second tightly coupled local bus; and wherein
the first processor is configured to be accessible to at least one of the resource in the first co-processor and the resource in the second co-processor through at least one of the first and second tightly coupled local buses; and
the second processor is configured to be accessible to at least one of the resource in the first co-processor and the resource in the second co-processor through at least one of the first and second tightly coupled local buses.

4. The multiprocessor apparatus according to claim 1, wherein
the plurality of processors including at least one other processor connected to the co-processor through the common bus; and
the arbitration circuit arbitrates contention for use of a resource in the co-processor by the at least one processor among the plurality of processors through the tightly coupled local buses and by the at least one other processor through the common bus.

5. The multiprocessor apparatus according to claim 1, wherein
the arbitration circuit receives requests for use from the processors, and when contention for use of a resource among the resources in the co-processor by the processors occurs, the arbitration circuit permits the use of the resource in the co-processor by one of the processors and causes the use of the resource in the co-processor by each processor other than the one of the processors to be waited for.

6. The multiprocessor apparatus according to claim 1, wherein
the arbitration circuit is connected to the common bus to which the processors are connected; and
when contention for use of a resource among the resources in the co-processor by the plurality of processors is determined to occur based on signals output to the common bus from the plurality of processors, the arbitration circuit permits the use of the resource in the co-processor by one of the processors and causes the use of the resource in the co-processor by each processor other than the one of the processors to be waited for.

7. The multiprocessor apparatus according to claim 6, wherein
the co-processor includes at least one resource for which arbitration of resource usage among the processors is performed on each resource of the co-processor.

8. The multiprocessor apparatus according to claim 1, wherein
the co-processor comprises:
a plurality of resources; and
a plurality of interfaces corresponding to the plurality of resources, respectively; and wherein
the plurality of resources include at least one resource for which arbitration of use of the resources among the processors is performed for each resource.

9. The multiprocessor apparatus according to claim 8, wherein
the plurality of the resources in the co-processor are simultaneously usable by the plurality of the processors through the plurality of the interfaces corresponding to the plurality of resources, respectively.

10. The multiprocessor apparatus according to claim 1, wherein
in each of the processors, processing of sending an instruction to the co-processor and receiving an execution result of the instruction by the co-processor through the tightly coupled local buses is performed; and
the arbitration circuit arbitrates use of the resource in the co-processor by the processors for each stage of an instruction pipeline.

11. The multiprocessor apparatus of claim 1,
wherein the arbitration circuit receives information regarding a state of the co-processor from the co-processor, through a signal line, and
wherein the arbitration further comprises checking the requests against the received information regarding the state of the co-processor.

12. The multiprocessor apparatus of claim 1,
wherein the arbitration circuit is configured to perform arbitration for each instruction cycle of the co-processor.

* * * * *